US012755271B2

(12) United States Patent
Rule et al.

(10) Patent No.: US 12,755,271 B2
(45) Date of Patent: Oct. 6, 2026

(54) SYSTEM AND METHOD FOR PROVIDING TEMPORARY VIRTUAL PAYMENT CARD

(71) Applicant: Capital One Services, LLC, McLean, VA (US)

(72) Inventors: Jeffrey Rule, Chevy Chase, MD (US); Shelton Smith, Stafford, VA (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/225,913

(22) Filed: Jul. 25, 2023

(65) Prior Publication Data

US 2023/0368180 A1 Nov. 16, 2023

Related U.S. Application Data

(63) Continuation of application No. 17/741,021, filed on May 10, 2022, now Pat. No. 11,995,643.

(51) Int. Cl.

*G06Q 20/34* (2012.01)
*G06Q 20/32* (2012.01)
*G06Q 20/40* (2012.01)

(52) U.S. Cl.

CPC ....... *G06Q 20/351* (2013.01); *G06Q 20/3274* (2013.01); *G06Q 20/3278* (2013.01); *G06Q 20/4012* (2013.01); *G06Q 20/40145* (2013.01); *G06Q 20/40975* (2013.01); *G06Q 2220/00* (2013.01)

(58) Field of Classification Search

None

See application file for complete search history.

(56) References Cited

U.S. PATENT DOCUMENTS 7,146,159 B1 12/2006 Zhu
7,895,445 B1 * 2/2011 Albanese .............. H04L 63/101 713/172

(Continued)

FOREIGN PATENT DOCUMENTS

AU 2015393435 B2 * 1/2020 ........... G06F 21/335
CA 2624981 C * 6/2017 ........... G06F 21/606

(Continued)

OTHER PUBLICATIONS

T. Yuniati and R. Munir, "Secure E-Payment Method Based on Visual Cryptography," 2018 3rd International Conference on Information Technology, Information System and Electrical Engineering (ICITISEE), Yogyakarta, Indonesia, 2018. https://ieeexplore.ieee.org/document/8720999?source=IQplus (Year: 2018).*

(Continued)

*Primary Examiner* — El Mehdi Oussir
(74) *Attorney, Agent, or Firm* — KDW Firm PLLC; Andrew D. Kasnevich

(57) ABSTRACT

A system and method for providing a temporary virtual payment card are provided. The system includes a user device, an administrator processing system, an account processing system, and a database. The system is configured to receive a request for a temporary virtual payment card, verify the user, and provide a temporary virtual payment card.

20 Claims, 9 Drawing Sheets

(56) References Cited

U.S. PATENT DOCUMENTS

| | | | | |
|---|---|---|---|---|
| 8,577,803 | B2 | 11/2013 | Chatterjee | |
| 8,613,069 | B1 * | 12/2013 | Martini | G06F 21/33 455/410 |
| 9,589,266 | B2 | 3/2017 | Pourfallah et al. | |
| 9,710,807 | B2 | 7/2017 | Theurer et al. | |
| 9,760,871 | B1 | 9/2017 | Pourfallah et al. | |
| 9,805,370 | B1 | 10/2017 | Quigley et al. | |
| 9,836,727 | B1 | 12/2017 | Brennan et al. | |
| 9,955,332 | B2 | 4/2018 | Raleigh et al. | |
| 10,134,084 | B1 * | 11/2018 | Gabriele | G06Q 20/208 |
| 10,148,659 | B2 | 12/2018 | Nandakumar | |
| 10,255,623 | B2 * | 4/2019 | Chatterton | H04W 4/80 |
| 10,346,848 | B2 | 7/2019 | Ziat et al. | |
| 10,461,933 | B2 | 10/2019 | Le Saint et al. | |
| 10,467,622 | B1 * | 11/2019 | Rule | H04W 12/47 |
| 10,579,998 | B1 * | 3/2020 | Newman | H04L 9/3234 |
| 10,643,266 | B2 | 5/2020 | Isaacson et al. | |
| 10,657,531 | B1 | 5/2020 | Arumugam | |
| 10,664,824 | B2 | 5/2020 | Wong et al. | |
| 10,839,371 | B1 | 11/2020 | Vukich et al. | |
| 10,887,103 | B2 * | 1/2021 | Lu | H04L 63/0807 |
| 10,904,259 | B1 | 1/2021 | Rose et al. | |
| 11,055,683 | B1 | 7/2021 | Bartholomew et al. | |
| 11,062,302 | B1 * | 7/2021 | Ho | G06Q 20/3672 |
| 11,062,320 | B2 * | 7/2021 | Trivedi | G06Q 20/3278 |
| 11,080,777 | B2 | 8/2021 | Isaacson et al. | |
| 11,087,328 | B2 | 8/2021 | Carpenter et al. | |
| 11,126,635 | B2 | 9/2021 | Behzadi et al. | |
| 11,201,743 | B2 | 12/2021 | Le Saint et al. | |
| 11,218,854 | B2 | 1/2022 | Raleigh et al. | |
| 11,270,309 | B1 | 3/2022 | Ellis et al. | |
| 11,288,661 | B2 | 3/2022 | Hammad | |
| 11,295,308 | B1 | 4/2022 | Fortney et al. | |
| 11,316,843 | B1 * | 4/2022 | Li | G06Q 20/127 |
| 11,392,974 | B2 | 7/2022 | Boccardi et al. | |
| 11,403,630 | B2 | 8/2022 | Dua | |
| 11,416,840 | B1 | 8/2022 | Wolfe et al. | |
| 11,475,454 | B2 | 10/2022 | Patel et al. | |
| 11,810,123 | B1 * | 11/2023 | Douglas | G06Q 30/0226 |
| 12,141,871 | B1 * | 11/2024 | James | G06Q 20/065 |
| 2007/0083460 | A1 | 4/2007 | Bachenheimer | |
| 2011/0119155 | A1 * | 5/2011 | Hammad | G06Q 20/42 235/382 |
| 2012/0018506 | A1 * | 1/2012 | Hammad | G06Q 20/385 235/375 |
| 2012/0030047 | A1 * | 2/2012 | Fuentes | G06Q 20/326 705/26.1 |
| 2012/0116902 | A1 | 5/2012 | Cardina et al. | |
| 2012/0197807 | A1 * | 8/2012 | Schlesser | G06Q 20/3829 705/71 |
| 2013/0185202 | A1 | 7/2013 | Goldthwaite et al. | |
| 2013/0346302 | A1 | 12/2013 | Purves | |
| 2014/0019352 | A1 | 1/2014 | Shrivastava | |
| 2014/0164091 | A1 | 6/2014 | Hunt | |
| 2014/0298027 | A1 * | 10/2014 | Roberts | G06Q 20/20 713/171 |
| 2015/0019443 | A1 * | 1/2015 | Sheets | G06Q 20/3829 705/71 |
| 2015/0088756 | A1 * | 3/2015 | Makhotin | G06Q 20/12 705/71 |
| 2015/0095219 | A1 * | 4/2015 | Hurley | G06Q 20/382 705/39 |
| 2015/0186872 | A1 * | 7/2015 | Sobol | G06Q 20/351 705/41 |
| 2015/0269559 | A1 | 9/2015 | Inotay et al. | |
| 2015/0324768 | A1 | 11/2015 | Filter et al. | |
| 2016/0012465 | A1 | 1/2016 | Sharp | |
| 2016/0026997 | A1 * | 1/2016 | Tsui | G06Q 20/34 705/44 |
| 2016/0042263 | A1 | 2/2016 | Gaddam et al. | |
| 2016/0092858 | A1 * | 3/2016 | Giles | G06Q 20/227 705/14.1 |
| 2016/0117650 | A1 | 4/2016 | Weidenmiller et al. | |
| 2016/0162882 | A1 * | 6/2016 | McClung, III | G06Q 20/352 705/41 |
| 2016/0218875 | A1 | 7/2016 | Le Saint et al. | |
| 2016/0321664 | A1 * | 11/2016 | Erickson | G06Q 20/4014 |
| 2016/0342993 | A1 | 11/2016 | Morgan et al. | |
| 2016/0371668 | A1 | 12/2016 | Priebatsch et al. | |
| 2017/0024733 | A1 | 1/2017 | Purves et al. | |
| 2017/0103388 | A1 * | 4/2017 | Pillai | G06Q 20/3227 |
| 2017/0193475 | A1 * | 7/2017 | Mercille | G06Q 20/3274 |
| 2017/0193507 | A1 * | 7/2017 | Jones | G06Q 20/10 |
| 2017/0262845 | A1 | 9/2017 | Eisen | |
| 2017/0316400 | A1 * | 11/2017 | Venkatakrishnan | G06Q 20/3227 |
| 2017/0353353 | A1 | 12/2017 | Nicholas et al. | |
| 2017/0373852 | A1 * | 12/2017 | Cassin | H04L 63/062 |
| 2018/0047016 | A1 * | 2/2018 | Sarin | G06Q 20/3674 |
| 2018/0047021 | A1 | 2/2018 | Uppalapati et al. | |
| 2018/0096320 | A1 * | 4/2018 | Yu | G06Q 20/36 |
| 2018/0181964 | A1 | 6/2018 | Zagarese et al. | |
| 2018/0181997 | A1 * | 6/2018 | Sanjeevaiah Krishnaiah | H04L 67/53 |
| 2018/0240101 | A1 | 8/2018 | Chan | |
| 2018/0276656 | A1 | 9/2018 | Goyal et al. | |
| 2018/0308095 | A1 * | 10/2018 | Hammad | G06Q 20/409 |
| 2018/0330367 | A1 | 11/2018 | Sharma | |
| 2018/0336543 | A1 | 11/2018 | Van Os et al. | |
| 2019/0080058 | A1 * | 3/2019 | Thomas | H04L 63/08 |
| 2019/0122212 | A1 | 4/2019 | Huxham et al. | |
| 2019/0122220 | A1 | 4/2019 | Phillips et al. | |
| 2019/0122222 | A1 * | 4/2019 | Uechi | G06Q 20/42 |
| 2019/0213578 | A1 | 7/2019 | Reijkens | |
| 2019/0295118 | A1 | 9/2019 | Martin et al. | |
| 2019/0325407 | A1 | 10/2019 | Zhou et al. | |
| 2020/0027088 | A1 | 1/2020 | Jajara et al. | |
| 2020/0073924 | A1 | 3/2020 | Sokol et al. | |
| 2020/0074114 | A1 * | 3/2020 | Cheng | G06F 21/57 |
| 2020/0097960 | A1 | 3/2020 | Wong et al. | |
| 2020/0111102 | A1 * | 4/2020 | Vukich | G06Q 20/40145 |
| 2020/0184482 | A1 | 6/2020 | Sharma et al. | |
| 2020/0366669 | A1 | 11/2020 | Gupta et al. | |
| 2020/0387887 | A1 * | 12/2020 | Rathod | G06Q 20/3224 |
| 2021/0019755 | A1 * | 1/2021 | Omojola | G06Q 20/322 |
| 2021/0042724 | A1 * | 2/2021 | Rathod | G07G 1/0054 |
| 2021/0150616 | A1 | 5/2021 | Kentris et al. | |
| 2021/0174363 | A1 | 6/2021 | Locke et al. | |
| 2021/0272097 | A1 | 9/2021 | Wen et al. | |
| 2021/0312437 | A1 * | 10/2021 | Torii | G06Q 20/381 |
| 2021/0319192 | A1 | 10/2021 | Rodriguez et al. | |
| 2021/0357938 | A1 | 11/2021 | Arumugam | |
| 2021/0398115 | A1 | 12/2021 | Newman | |
| 2021/0398205 | A1 | 12/2021 | Rule et al. | |
| 2021/0406852 | A1 | 12/2021 | Carey et al. | |
| 2022/0058648 | A1 * | 2/2022 | Mahalle | G06F 21/32 |
| 2022/0067700 | A1 | 3/2022 | Hallaq et al. | |
| 2022/0138725 | A1 | 5/2022 | Sneider et al. | |
| 2022/0147587 | A1 * | 5/2022 | Douglas | G06F 21/629 |
| 2022/0156355 | A1 | 5/2022 | Adcock et al. | |
| 2022/0188866 | A1 * | 6/2022 | Farmer | G06Q 30/0266 |
| 2022/0188867 | A1 * | 6/2022 | Farmer | H04W 4/38 |
| 2022/0198431 | A1 * | 6/2022 | Foster, Jr. | G06Q 20/322 |
| 2022/0207534 | A1 * | 6/2022 | Barkhurst | G06Q 20/4014 |
| 2022/0215419 | A1 * | 7/2022 | Dermosessian | G06Q 20/1085 |
| 2022/0245606 | A1 | 8/2022 | Chauhan et al. | |
| 2022/0245623 | A1 * | 8/2022 | Filter | G06K 7/1417 |
| 2022/0383315 | A1 | 12/2022 | Eisen | |
| 2022/0383325 | A1 * | 12/2022 | Hoffman | G06Q 20/4018 |
| 2022/0391872 | A1 * | 12/2022 | Sharma | G06Q 20/3674 |
| 2023/0066754 | A1 | 3/2023 | Prasad | |
| 2023/0109544 | A1 | 4/2023 | Fletcher | |
| 2023/0153807 | A1 * | 5/2023 | Ma | G06Q 20/40145 705/39 |
| 2023/0368211 | A1 * | 11/2023 | Douglas | G06Q 20/204 |
| 2024/0015030 | A1 * | 1/2024 | Cameron | H04L 9/50 |
| 2024/0177208 | A1 * | 5/2024 | Kumar | G06Q 30/0641 |
| 2024/0242199 | A1 * | 7/2024 | Rapowitz | G06Q 20/352 |
| 2024/0354741 | A1 * | 10/2024 | Kumar | G06Q 20/341 |

(56) References Cited

U.S. PATENT DOCUMENTS

| | | | | |
|---|---|---|---|---|
| 2025/0209440 | A1* | 6/2025 | McHugh | G06Q 20/3221 |
| 2025/0259161 | A1* | 8/2025 | Rule | G06Q 20/4014 |

FOREIGN PATENT DOCUMENTS

| | | | | | |
|---|---|---|---|---|---|
| CA | 2990119 | | | 6/2018 | |
| CA | 3172005 | | | 9/2021 | |
| CN | 1394408 | A | * | 1/2003 | G06F 17/00 |
| CN | 103765453 | | | 4/2014 | |
| CN | 103843024 | A | * | 6/2014 | G06Q 30/02 |
| CN | 104769626 | | | 7/2015 | |
| CN | 105359179 | A | * | 2/2016 | G06Q 20/027 |
| CN | 107210918 | | | 9/2017 | |
| CN | 107256355 | | | 10/2017 | |
| CN | 107451813 | | | 12/2017 | |
| CN | 107533708 | A | * | 1/2018 | G06F 21/335 |
| CN | 109146564 | A | * | 1/2019 | |
| CN | 109426954 | | | 3/2019 | |
| CN | 109754257 | A | * | 5/2019 | G06F 21/316 |
| CN | 110310113 | | | 10/2019 | |
| CN | 110622186 | A | * | 12/2019 | G06Q 30/0224 |
| CN | 110663055 | A | * | 1/2020 | G06Q 20/10 |
| CN | 110770774 | A | * | 2/2020 | G06F 21/64 |
| CN | 110914848 | | | 3/2020 | |
| CN | 111279336 | A | * | 6/2020 | G06F 16/951 |
| CN | 112119416 | | | 12/2020 | |
| CN | 113268759 | A | * | 8/2021 | G06F 21/45 |
| CN | 108604338 | B | * | 11/2021 | G06Q 20/12 |
| CN | 114650142 | B | * | 1/2024 | H04L 9/3213 |
| CN | 113382405 | B | * | 8/2024 | H04L 67/10 |
| DE | 102015208098 | B4 | * | 7/2022 | G06F 21/645 |
| EP | 3061056 | | | 12/2021 | |
| GB | 2597581 | | | 2/2022 | |
| KR | 20150084659 | A | * | 1/2015 | |
| WO | WO-2012174427 | A2 | * | 12/2012 | G06Q 20/401 |
| WO | 2013/157797 | | | 10/2013 | |
| WO | 2015/126753 | | | 8/2015 | |
| WO | 2015145335 | | | 10/2015 | |
| WO | 2015/184114 | | | 12/2015 | |
| WO | WO-2017070638 | A1 | * | 4/2017 | G03H 1/0011 |
| WO | 2017/120605 | | | 7/2017 | |
| WO | 2017141218 | | | 8/2017 | |
| WO | 2017172940 | | | 10/2017 | |
| WO | 2018111858 | | | 6/2018 | |
| WO | WO-2018118067 | A1 | * | 6/2018 | G06Q 20/02 |
| WO | 2019/094488 | | | 5/2019 | |
| WO | 2020/046906 | | | 3/2020 | |
| WO | 2020/049452 | | | 3/2020 | |
| WO | WO-2020148658 | A2 | * | 7/2020 | G06F 21/64 |
| WO | WO-2020153798 | A1 | * | 7/2020 | G06Q 20/4014 |
| WO | 2021/135206 | | | 7/2021 | |
| WO | WO-2023022719 | A1 | * | 2/2023 | |

OTHER PUBLICATIONS

W. Liu, X. Wang and W. Peng, "State of the Art: Secure Mobile Payment," in IEEE Access, vol. 8, p. 13898-13914, 2020. https://ieeexplore.ieee.org/document/8947955?source=IQplus (Year: 2020).*

P. Urien, M. Pasquet and C. Kiennert, "A breakthrough for prepaid payment: End to end token exchange and management using secure SSL channels created by EAP-TLS smart cards," International Conference on Collaboration Technologies and Systems.https://ieeexplore.ieee.org/document/5928726?source=IQplus (Year: 2011).*

J. Shanmugapriyan, R. Parthasarathy, S. Sathish and S. Prasanth, "Secure Electronic Transaction Using AADHAAR Based QR Code and Biometric Authentication," (IC3IoT), Chennai, India, 2022, pp. 1-4, https://ieeexplore.ieee.org/document/9767978?source =IQplus. (Year: 2022).*

S. Saxena, S. Vyas, B. S. Kumar and S. Gupta, "Survey on Online Electronic Paymentss Security," 2019 Amity International Conference on Artificial Intelligence (AICAI), Dubai, United Arab Emirates, 2019, pp. 746-751, https://ieeexplore.ieee.org/document/8701353?source=IQplus. (Year: 2019).*

W. Liu, X. Wang and W. Peng, "State of the Art: Secure Mobile Payment," in IEEE Access, vol. 8, 2020 https://ieeexplore.ieee.org/document/8947955?source=IQplus. (Year: 2020).*

Smart Card ID: An Evolving and Viable Technology. https://pdfs.semanticscholar.org/ff61/d9795621e40557fd97e0d33692cde032a4c1.pdf (Year: 2018).

W. Liu et al., "State of the Art: Secure Mobile Payment," in IEEE Access, vol. 8, pp. 13898-13914, 2020, https://eexplore.ieee.org/stamp/stamp.jsp?tp=&amnumber=8947955 (Year: 2019).

Ritcha Ranjan, "Tokenization of a Physical Device or Credit Card for Payment", https://prioart.ip.com/IPCOM/000251283 (Year: 2017).

Igbal et al., ""A Novel Mobile Wallet Model for Elderly Using Fingerprint as Authentication Factor"," IEEE, vol. 8, 2022, https://ieeexplore.ieee.org/stamp/stamp.jsp?arnumber=9201279 (Year: 2020).

Joshi, S.:"What is User Provisioning? All You Need to Know in One Place", Jan. 10, 2022, pp. 1-21 (Year: 2022).

Nils: "The Push Provisioning Concept-how to push card to mobile wallets, merchants and wearables" Feb. 18, 2021, pp. 1-6 (Year: 2021).

Mastercard: "MDES Token Connect—Token Requester Implementation Guide and Specifications" Dec. 21, 2021, pp. 1-74 (Year: 2021).

Starnberger et al., "QR-TAN: Secure Mobile Transaction Authentication", https://citeseerx.ist.psu.edu/document?repid=1&type=pdfdol=c0ac1736fc726189175e06c98919b7b362a7bb8f (Year: 2009).

S. Nseir, N. Hirzallah and M. Aqel, "A secure mobile payment system using QR code," 2013 5th International Conference on Computer Science and Information Technology, Amman, Jordan, 2013, pp. 111-114 (Year: 2013).

Notification of Transmittal of the International Search Report and the Written Opinion of the International Searching Authority issued in PCT/US2023/021462, mailed Aug. 14, 2023, 19 pages.

* cited by examiner

Sequence 800

SYSTEM AND METHOD FOR PROVIDING TEMPORARY VIRTUAL PAYMENT CARD

CROSS-REFERENCE TO RELATED APPLICATION

The subject application is a continuation of U.S. patent application Ser. No. 17/741,021 filed May 10, 2022, the contents of which is hereby incorporated by reference in their entirety.

FIELD OF DISCLOSURE

The present disclosure relates generally to providing a temporary virtual payment card.

BACKGROUND

Temporary virtual payment cards are an easy, safe way to shop at merchant stores. Unlike a credit or debit card, a virtual payment card is a virtual token or string of numbers connected to a user's main payment account. Their ease of use and their protection against fraud make virtual cards an attractive option for shoppers. Current methods require consumers to sign up for a virtual card before shopping or otherwise perform a lengthy sign-in and verification process, which itself can place user information at risk of fraud. This is process is time-consuming, degrades the consumer's experience, and discourages consumers from obtaining virtual cards.

Therefore, there are deficiencies in the current market. Accordingly, there is a need to provide systems and methods that overcome these deficiencies and provide for an efficient and secure way to acquire a temporary virtual payment card.

SUMMARY OF THE DISCLOSURE

Aspects of the disclosed embodiments include a system and method for providing a temporary virtual payment card to a user.

Embodiments of the present disclosure provide a method for providing a temporary virtual payment card, the method comprising: receiving, by an administrator data processor from a user device associated with an account holder having a user account administrated by the administrator data processor, a request for a temporary virtual payment card; receiving, by the administrator data processor from the user device, a user datum associated with the account holder; encrypting the user datum by the administrator data processor using user datum encryption information; transmitting, by the administrator data processor to each of the plurality of account processing systems, a user account query including the encrypted user datum, wherein each account processing system is associated with a different account provider and has been provisioned with the user datum encryption information; receiving, by the administrator data processor from at least one of the plurality of account processing systems, a response comprising a notification that the account holder has a transaction account processed by that account processing system; transmitting, by the administrator data processor to the user device, a confirmation request identifying the account providers associated with the at least one of the plurality of account processing system; receiving, by the administrator data processor from the user device, a confirmation response including identification of a selected account provider; transmitting, by the administrator data processor to the account processing system associated with the selected account provider, the confirmation response; and receiving, by the administrator data processor from the account processing system associated with the selected account provider temporary virtual payment card information configured for processing a payment transaction on the account holder's transaction account.

Embodiments of the present disclosure provide an automated system for provisioning a temporary virtual payment card, the system comprising: an administrator data processor configured to: receive, over a network from a user device associated with an account holder having a user account administrated by the administrator data processor, a request for a temporary virtual payment card; receive, from the user device over the network, a user datum associated with the account holder; encrypt the user datum using user datum encryption information; transmit, to each of a plurality of account processing systems, a user account query including the encrypted user datum wherein each account processing system is associated with a different account provider and has been provisioned with the user datum encryption information; receive, from at least one of the plurality of account processing systems, a response comprising a notification that the account holder has a transaction account processed by that account processing system; transmit, to the user device over the network, a confirmation request identifying the account providers associated with the at least one of the plurality of account processing system; receive, from the user device over the network, a confirmation response including identification of a selected account provider; transmit, to the account processing system associated with the selected account provider, the confirmation response; and receive, from the account processing system associated with the selected account provider temporary virtual payment card information configured for processing a payment transaction on the account holder's transaction account.

Embodiments of the present disclosure provide a non-transitory, computer readable medium comprising instructions that, when executed on a data processing system, perform actions comprising: receiving, from a user device associated with an account holder having a user account administrated by the administrator data processor, a request for a temporary virtual payment card; receiving, from the user device, a user datum associated with the account holder; encrypting the user datum using the user datum encryption information; transmitting, to each of a plurality of account processing systems, a user account query including the encrypted user datum, wherein each account processing system is associated with a different account provider and has been provisioned with the user datum encryption information; receiving, from at least one of the plurality of account processing systems, a response comprising a notification that the account holder has a transaction account processed by that account processing system; transmitting, to the user device, a message comprising a confirmation request identifying the account providers associated with the at least one of the plurality of account processing system; receiving, from the user device, a confirmation response including identification of a selected account provider; transmitting, to the account processing system associated with the selected account provider, the confirmation response; and receiving, from the at least one account processing system associated with the selected account provider temporary virtual payment card information configured for processing a payment transaction on the account holder's transaction account.

BRIEF DESCRIPTION OF THE DRAWINGS

In order to facilitate a fuller understanding of the present invention, reference is now made to the attached drawings.

The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Furthermore, the described features, advantages, and characteristics of the embodiments may be combined in any suitable manner. One skilled in the relevant art will recognize that the embodiments may be practiced without one or more of the specific features or advantages of an embodiment. In other instances, additional features and advantages may be recognized in certain embodiments that may not be present in all embodiments.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The systems and method provided improve upon conventional methods for requesting and transmitting a temporary virtual payment card. By connecting the user, the merchant, and the banking institution together into one system, the user can get his or her virtual payment card quickly and in a manner that does not degrade the user experience. In addition to creating a better experience for the user, this benefits card-issuing entities by promoting the use of virtual payments cards.

The hashing of the user's email or some other personal identifying information such as a phone number promotes the security of the user's personal identity and sensitive information. Additionally, the user verification further protects the user's financial information. In some examples, the user's personal identity and sensitive information may be known only to the card-issuing entity and/or the merchant involved in the transaction and may not be needed by the customer, even at the point-of-sale. These security advantages benefit both the user, the card-issuing entity, and the merchant.

Figure 1:
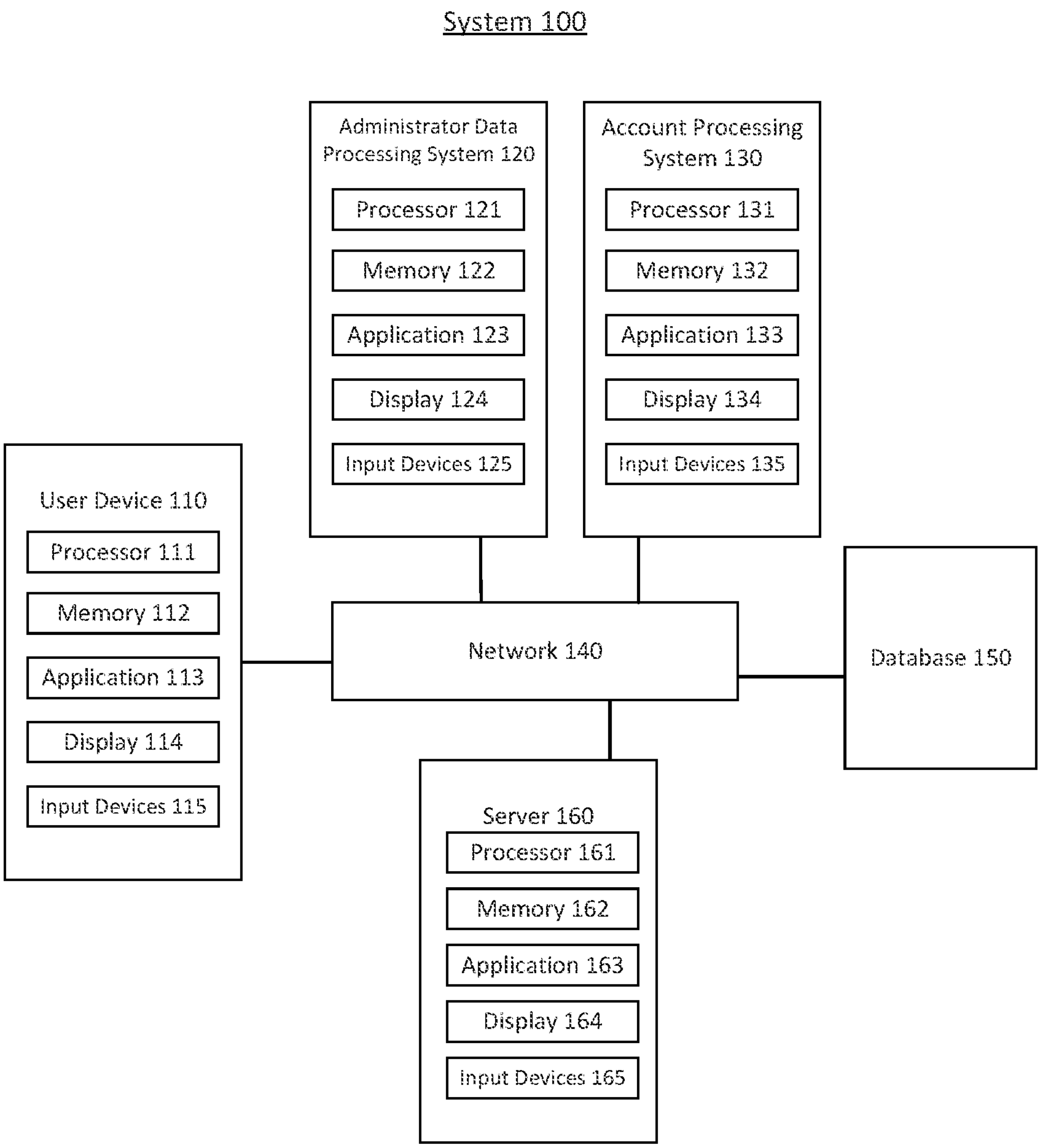
FIG. 1 is a block diagram illustrating a system according to an exemplary embodiment.

FIG. 1 illustrates a block diagram of a system according to an exemplary embodiment. The system 100 may comprise a user device 110, an administrator data processor 120, an account processing system 130, a network 140, a database 150, and a server 160. Although FIG. 1 illustrates single instances of components of system 100, system 100 may include any number of components.

System 100 may include a user device 110. The user device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 110 may include a processor 111, a memory 112, and an application 113. The processor 111 may be a processor, a microprocessor, or other processor, and the user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at one point in time. Once the memory is programmed, it may not be rewritten, but it may be read many times. A read/write memory may be programmed and re-programed many times after leaving the factory. It may also be read many times. The memory 112 may be configured to store one or more software applications, such as the application 113, and other data, such as user's private data and financial account information.

The application 113 may comprise one or more software applications, such as a mobile application and a web browser, comprising instructions for execution on the user device 110. In some examples, the user device 110 may execute one or more applications, such as software applications, that enable, for example, network communications with one or more components of the system 100, transmit and/or receive data, and perform the functions described herein. Upon execution by the processor 111, the application 113 may provide the functions described in this specification, specifically to execute and perform the steps and functions in the process flows described below. Such processes may be implemented in software, such as software modules, for execution by computers or other machines. The application 113 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, touch-screen, microphone, digital camera, video recorder or camcorder. These devices may be used to enter information and interact with the software and other devices described herein.

System 100 may include an administrator data processing system 120. The administrator data processing system 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The administrator data processing system 120 may include a processor 121, a memory 122, and an application 123. The processor 121 may be a processor, a microprocessor, or other processor, and the administrator data processing system 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the administrator data processing system 120 may include one or more of these memories. A read-only memory may be factory programmable as read-only or one-time programmable. One-time programmability provides the opportunity to write once then read many times. A write-once read-multiple memory may be programmed at one point in time. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as user's private data and financial account information.

The application 123 may comprise one or more software applications, such as a mobile application and a web browser, comprising instructions for execution on the administrator data processing system 120. In some examples, the administrator data processing system 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. Such processes may be implemented in software, such as software modules, for execution by computers or other machines. The application 123 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The administrator data processing system 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the administrator data processing system 120 that is available and supported by the administrator data processing system 120, such as a touch-screen, keyboard, mouse, cursor-control device, touch-screen, microphone, digital camera, video recorder or camcorder. These devices may be used to enter information and interact with the software and other devices described herein. The administrator data processor 120 may transmit or receive data with the user device, the account processing system, the server, or the database over the network.

System 100 may include an account processing system 130. The account processing system 130 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The account processing system 130 may include a processor 131, a memory 132, and an application 133. The processor 131 may be a processor, a microprocessor, or other processor, and the account processing system 130 may include one or more of these processors. The processor 131 may include processing circuitry, which may contain additional components, including additional processors, memories, error and parity/CRC checkers, data encoders, anticollision algorithms, controllers, command decoders, security primitives and tamper-proofing hardware, as necessary to perform the functions described herein.

The processor 131 may be coupled to the memory 132. The memory 132 may be a read-only memory, write-once read-multiple memory or read/write memory, e.g., RAM, ROM, and EEPROM, and the account processing system 130 may include one or more of these memories. A read-only memory may be factory programmable as read-only or one-time programmable. One-time programmability provides the opportunity to write once then read many times. A write-once read-multiple memory may be programmed at one point in time. Once the memory is programmed, it may not be rewritten, but it may be read many times. A read/write memory may be programmed and re-programed many times after leaving the factory. It may also be read many times. The memory 132 may be configured to store one or more software applications, such as the application 133, and other data, such as user's private data and financial account information.

The application 133 may comprise one or more software applications, such as a mobile application and a web browser, comprising instructions for execution on the account processing system 130. In some examples, the account processing system 130 may execute one or more applications, such as software applications, that enable, for example, network communications with one or more components of the system 100, transmit and/or receive data, and perform the functions described herein. Upon execution by the processor 131, the application 133 may provide the functions described in this specification, specifically to execute and perform the steps and functions in the process flows described below. Such processes may be implemented in software, such as software modules, for execution by computers or other machines. The application 133 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The account processing system 130 may further include a display 134 and input devices 135. The display 134 may be any type of device for presenting visual information such as a computer monitor, a flat panel display, and a mobile device screen, including liquid crystal displays, light-emitting diode displays, plasma panels, and cathode ray tube displays. The input devices 135 may include any device for entering information into the account processing system 130 that is available and supported by the account processing system 130, such as a touch-screen, keyboard, mouse, cursor-control device, touch-screen, microphone, digital camera, video recorder or camcorder. These devices may be used to enter information and interact with the software and other devices described herein.

The account processing system 130 may transmit or receive data with the user device, the account processing system, the server, or the database over the network.

System 100 may include one or more networks 140. In some examples, the network 140 may be one or more of a wireless network, a wired network or any combination of wireless network and wired network, and may be configured to connect the user device 110, the account processing system 130, the database 150 and the server 160. For example, the network 140 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 140 may include, without limitation, telephone lines, fiber optics, IEEE Ethernet 902.3, a wide area network, a wireless personal area network, a LAN, or a global network such as the Internet. In addition, the network 140 may support an Internet network, a wireless communication network, a cellular network, or the like, or any combination thereof. The network 140 may further include one network, or any number of the exemplary types of networks mentioned above, operating as a stand-alone network or in cooperation with each other. The network 140 may utilize one or more protocols of one or more network elements to which they are communicatively coupled. The network 140 may translate to or from other protocols to one or more protocols of network devices. Although the network 140 is depicted as a single network, it should be appreciated that according to one or more examples, the network 140 may comprise a plurality of interconnected networks, such as, for example, the Internet, a service provider's network, a cable television network, corporate networks, such as credit card association networks, and home networks. The network 140 may further comprise, or be configured to create, one or more front channels, which may be publicly accessible and through which communications may be observable, and one or more secured back channels, which may not be publicly accessible and through which communications may not be observable.

System 100 may include a database 150. The database 150 may be one or more databases configured to store data, including without limitation, private data of users, financial accounts of users, identities of users, transactions of users, and certified and uncertified documents. The database 150 may comprise a relational database, a non-relational database, or other database implementations, and any combination thereof, including a plurality of relational databases and non-relational databases. In some examples, the database 150 may comprise a desktop database, a mobile database, or an in-memory database. Further, the database 150 may be hosted internally by the account processing system 130 or may be hosted externally of the account processing system 130, such as by a server, by a cloud-based platform, or in any storage device that is in data communication with the account processing system 130.

System 100 may include a server 160. The server 160 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

While FIG. 1 illustrates a single server 160, it is understood that other embodiments can use multiple servers or multiple computer systems as necessary or desired to support the users and can also use back-up or redundant servers to prevent network downtime in the event of a failure of a particular server. In some examples, server 160 can be a dedicated server computer, such as bladed servers, or can be personal computers, laptop computers, notebook computers, palm top computers, network computers, mobile devices, wearable devices, or any processor-controlled device capable of supporting the system 100.

The server 160 may include a processor 161, a memory 162, and an application 163. The processor 161 may be a processor, a microprocessor, or other processor, and the server 160 may include one or more of these processors. The processor 161 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 161 may be coupled to the memory 162. The memory 162 may be a read-only memory, write-once read-multiple memory or read/write memory, e.g., RAM, ROM, and EEPROM, and the server 160 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 162 may be configured to store one or more software applications, such as the application 163, and other data, such as user's private data and financial account information.

The application 163 may comprise one or more software applications comprising instructions for execution on the server 160. In some examples, the server 160 may execute one or more applications, such as software applications, that enable, for example, network communications with one or more components of the system 100, transmit and/or receive data, and perform the functions described herein. Upon execution by the processor 161, the application 163 may provide the functions described in this specification, specifically to execute and perform the steps and functions in the process flows described below. For example, the application 163 may be executed to perform receiving web form data from the user device 110 and the server 160, retaining a web session between the user device 110 and the server 160, and masking private data received from the user device 110 and the server 160. Such processes may be implemented in software, such as software modules, for execution by computers or other machines. The application 163 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 160 may further include a display 164 and input devices 165. The display 164 may be any type of device for presenting visual information such as a computer monitor, a flat panel display, and a mobile device screen, including liquid crystal displays, light-emitting diode displays, plasma panels, and cathode ray tube displays. The input devices 165 may include any device for entering information into the server 160 that can be available and supported by the server 160, such as a touch-screen, keyboard, mouse, cursor-control device, touch-screen, microphone, digital camera, video recorder or camcorder. These devices may be used to enter information and interact with the software and other devices described herein.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a non-transitory computer-accessible medium (e.g., RAM, ROM, hard drive, or other storage device). For example, a computer-accessible medium can be part of the memory of the user device 110, administrator data processing system 120, account processing system 130, and database 150, and/or server 160 or other computer hardware arrangement.

In some examples, a computer-accessible medium (e.g., as described herein, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Figure 2:
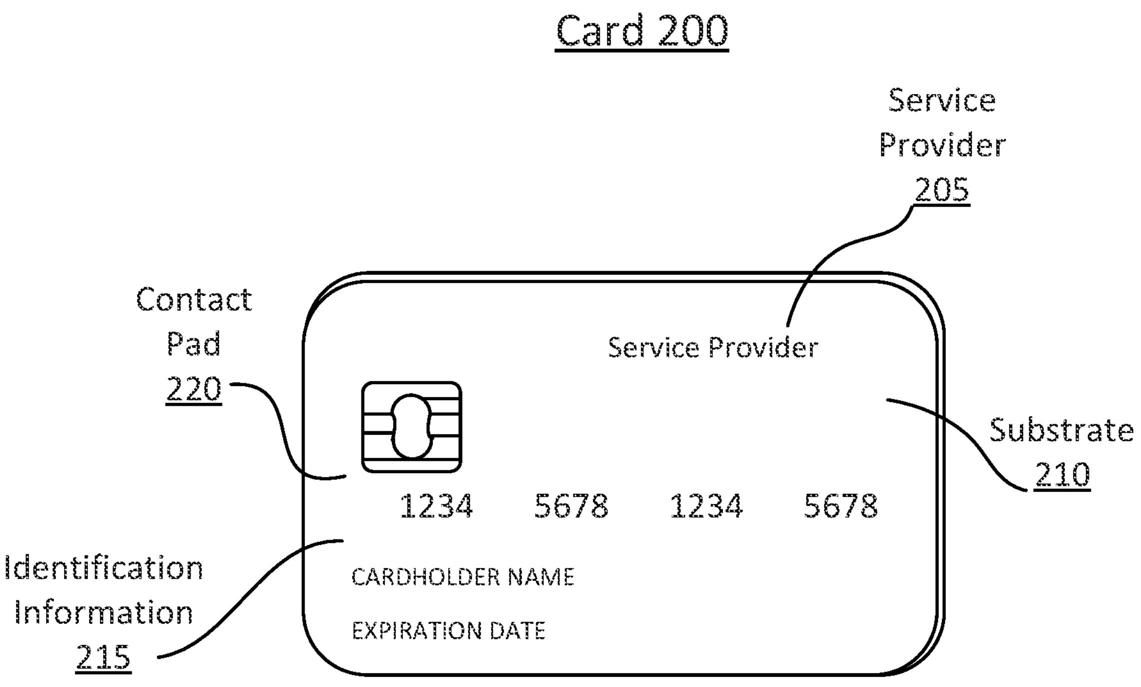
FIG. 2 is a diagram illustrating a contactless card according to an exemplary embodiment.

FIG. 2 is a diagram of a contactless card according to an exemplary embodiment. The contactless card may contain the same information described in the virtual payment card.

FIG. 2 illustrates a contactless card 200 according to an example embodiment. The contactless card 200 may comprise a payment card, such as a credit card, debit card, or gift card, issued by a service provider 205 displayed on the front or back of the card 200. In some examples, the payment card may comprise a dual interface contactless payment card. In some examples, the contactless card 200 is not related to a payment card, and may comprise, without limitation, an identification card, a membership card, a loyalty card, a transportation card, and a point of access card.

The contactless card 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, such as a user device, smart phone, laptop, desktop, or tablet computer. The contactless card 200 may also include processing circuitry, antenna and other components not shown in FIG. 2 and FIG. 3. These components may be located behind the contact pad 220 or elsewhere on the substrate 210. The contactless card 200 may also include a magnetic strip or tape, which may be located on the back of the card (not shown in FIG. 2).

Figure 3:
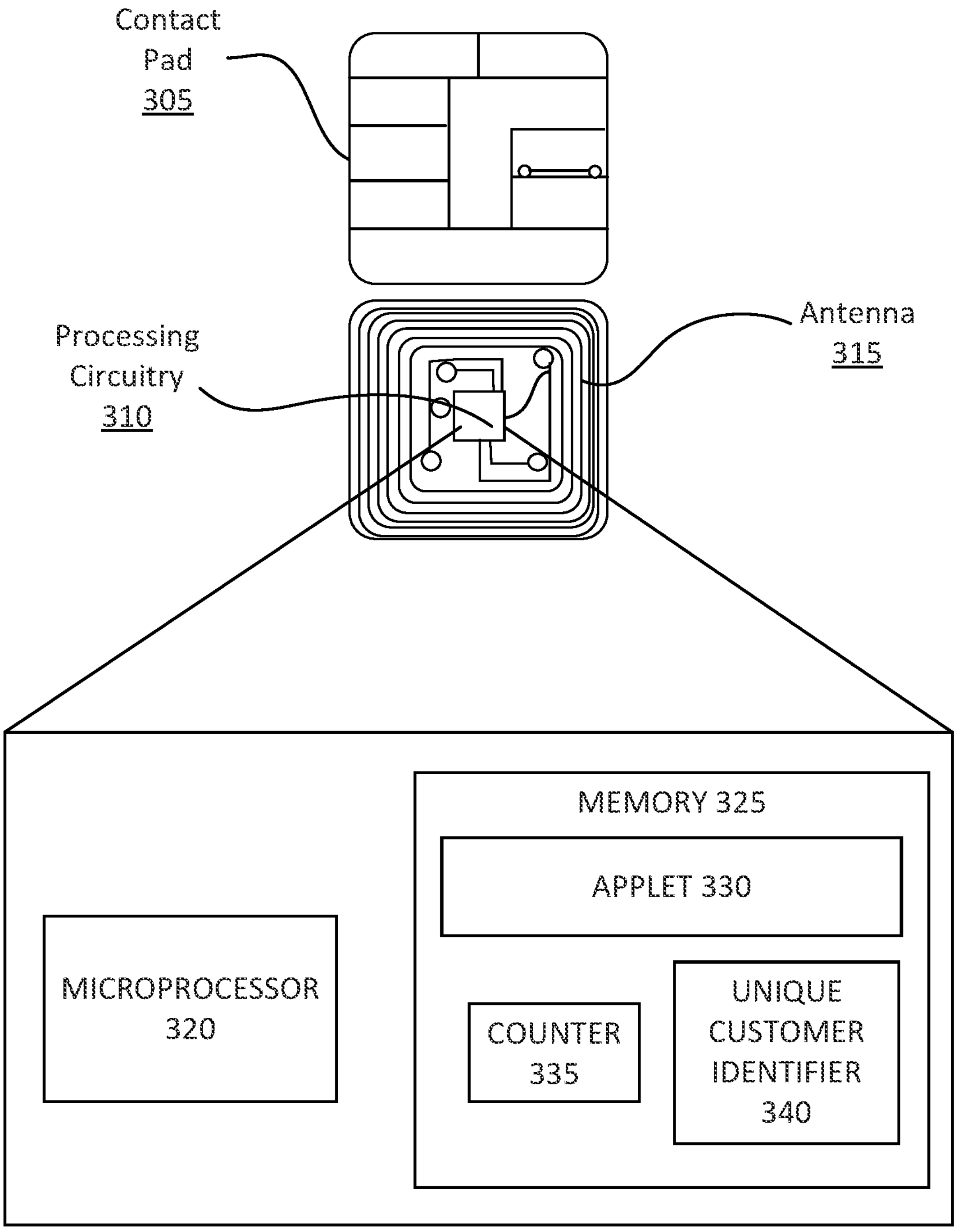
FIG. 3 is a diagram illustrating a contactless card according to an exemplary embodiment.

FIG. 3 illustrates a contactless card 200 according to an example embodiment. The contactless card may contain the same information described in the virtual payment card.

As illustrated in FIG. 3, the contact pad 305 may include processing circuitry 310 for storing and processing information, including a microprocessor 320 and a memory 325. It is understood that the processing circuitry 310 may contain additional components, including processors, memories, error and parity/CRC checkers, data encoders, anticollision algorithms, controllers, command decoders, security primitives and tamperproofing hardware, as necessary to perform the functions described herein.

The memory 325 may be a read-only memory, write-once read-multiple memory or read/write memory, e.g., RAM, ROM, and EEPROM, and the contactless card 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 325 may be configured to store one or more applets 330, one or more counters 335, and a customer identifier 340. The one or more applets 330 may comprise one or more software applications configured to execute on one or more contactless cards, such as Java Card applet. However, it is understood that applets 330 are not limited to Java Card applets, and instead may be any software application operable on contactless cards or other devices having limited memory. The one or more counters 335 may comprise a numeric counter sufficient to store an integer. The customer identifier 340 may comprise a unique alphanumeric identifier assigned to a user of the contactless card 200, and the identifier may distinguish the user of the contactless card from other contactless card users. In some examples, the customer identifier 340 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 305 or entirely separate from it, or as further elements in addition to processor 320 and memory 325 elements located within the contact pad 305.

In some examples, the contactless card 200 may comprise one or more antennas 315. The one or more antennas 315 may be placed within the contactless card 200 and around the processing circuitry 310 of the contact pad 305. For example, the one or more antennas 315 may be integral with the processing circuitry 310 and the one or more antennas 315 may be used with an external booster coil. As another example, the one or more antennas 315 may be external to the contact pad 305 and the processing circuitry 310.

In an embodiment, the coil of contactless card 200 may act as the secondary of an air core transformer. The terminal may communicate with the contactless card 200 by cutting power or amplitude modulation. The contactless card 200 may infer the data transmitted from the terminal using the gaps in the contactless card's power connection, which may be functionally maintained through one or more capacitors. The contactless card 200 may communicate back by switching a load on the contactless card's coil or load modulation. Load modulation may be detected in the terminal's coil through interference.

As explained above, the contactless cards 200 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that comprises a cryptographically secure OTP encoded as an NDEF text tag.

Figure 4:
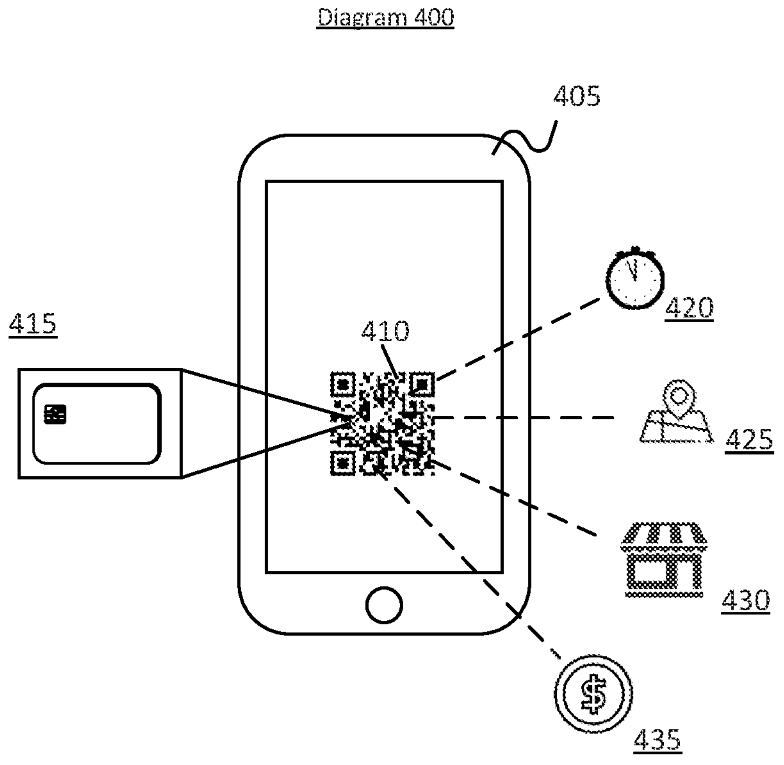
FIG. 4 is a diagram illustrating a virtual payment card according to an exemplary embodiment.

FIG. 4 illustrates a virtual payment card according to an exemplary embodiment.

Virtual payment cards are unique payment cards that allow users to complete transactions on their main payment card account associated with one or more of their financial accounts. In some examples, virtual payments cards can be limited to one-time use. In other examples, virtual payment cards can be limited to a predetermined number of uses and/or an unlimited number of uses over a predetermined time period. It is understood that virtual payment cards can have other characteristics and features as described herein.

Diagram 400 illustrates an example of a virtual payment card. The virtual payment card can be available on a user device 405 and/or contactless card 200. Although the user device shown in the figure is a smart phone, it is understood that the user device can also include without limitation any network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or other a computer device or communications device.

The virtual payment card can be displayed on the user device as a quick response (QR) code 410. The QR code may be configured to embody information usable by a merchant administrative data processor (e.g., the administrator data processing system 120 of FIG. 1) to process a payment transaction. More particularly, the QR code can contain provisioning information associated with the user's physical payment card connected to an account such as a spending account, growth account, or savings account. The QR code can also contain information associated with a user's gift card or rewards account. A merchant or other administrator processing system can obtain an image 415 or otherwise scan the QR code to perform a transaction. Although FIG. 4 illustrates the virtual payment card as a QR code, it is understood that the virtual payment card may take other forms such as unique code, an NFC-enabled application, or a payment token. In payment card tokenization, the user's primary account number is replaced with a series of randomly generated numbers. This series of numbers is the token. The token can be passed from a user device to an administrator processing system over a network. Payment tokens may be used within mobile applications or web applications. In some embodiments, the user may register their contactless payment card data with the application or e-business whom they want to pay.

The virtual payment card may be available on a third-party mobile application or web application. The virtual payment card may be sent via SMS or MMS messaging from an account processing system. The virtual card may contain the information present on a physical contactless card discussed in FIG. 2 and FIG. 3.

To protect the user's information, the virtual payment card may come with limitations. In element 420, the card may be limited by time. The virtual payment card may expire after a certain amount of time, for example fifteen minutes. It is understood that the amount of time can be lengthened or shortened greatly. In element 425, the virtual payment card may be limited by geography. The virtual payment card may expire if the user device leaves a predetermined geographical area. This predetermined area can be decided by the administrator processing system, the account processing system, or the users themselves. The geographical area can vary considerably. For example, the virtual card may be limited to a small area around a particular storefront. As another example, the virtual card In element 430, the virtual payment card may be limited by vendor to only one or more vendors. For example, a card may be limited to only one unique vendor in a unique location. Alternatively, the virtual card may be limited to vendors in a designated area such as a mall, market, or flea market. In another example, the virtual card may be limited to an entire franchise—that is, the card may be used at any store that is associated with a specific franchise. In element 435, the virtual payment card may be limited by the amount of money available on the card. The card may be capped at a certain amount, for example $100. This amount can vary considerably. This amount can be determined by the user, the administrator processing system, or the account processing system. It is understood that a virtual payment card may combine these one or more limitations.

In some embodiments, the QR code can have all of the data that is necessary to create the virtual card. The limits and security features listed above may be increased, decreased, or otherwise changed. These changes can be implemented by the user, the administrator data processor, or the account data processor.

Figure 5:
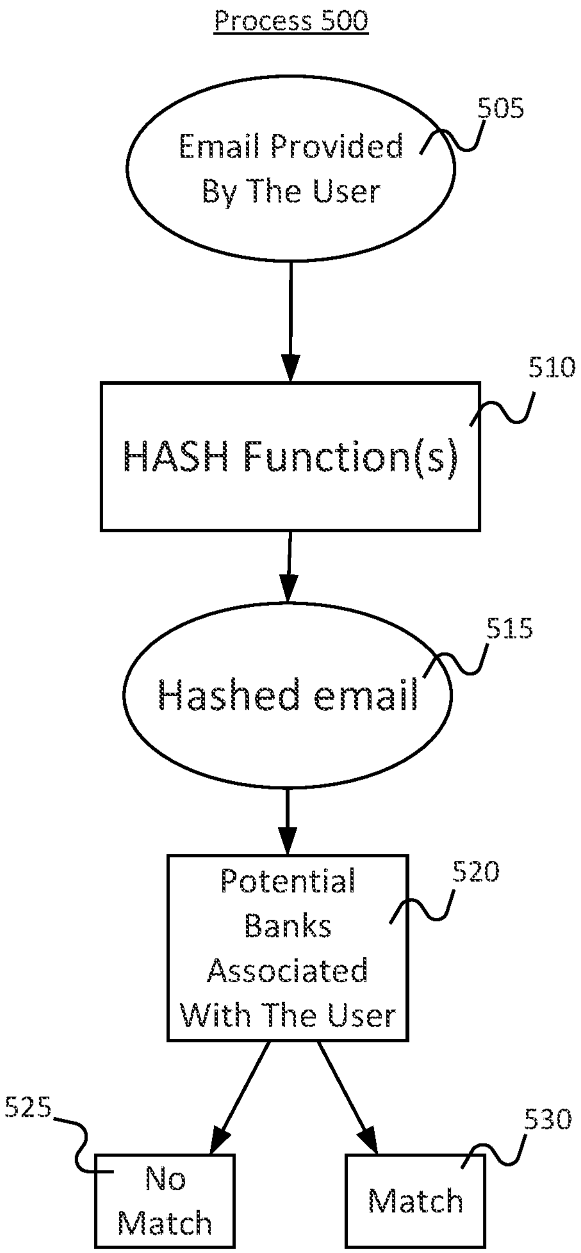
FIG. 5 is a diagram illustrating an encryption process according to an exemplary embodiment.

FIG. 5 illustrates a process of hashing a user's information and sending it to account processing systems.

The process 500 illustrates the process of receiving personal information in the form of a user datum from the user, hashing or otherwise encrypting the information using datum encryption information, sending the hashed information to one or more bank systems, and receiving a notification from the one or banks confirming that they have a matching hashed user datum on file. This process assumes that an encryption and/or hashing function and any other required datum encryption information is available to each bank system to allow hashing of its account holder data for comparison. This process improves the security of the present methods and systems by ensuring that the user's un-hashed personal information is never shared. This also prevents the personal information from being intercepted by interfering parties. It is understood that although FIG. 5 describes a process including an email, the process can include other types of information including but not limited to phone numbers, addresses, passwords, and other identifying information associated with an account on file with an account processing system or merchant.

The process 500 can begin with action 505 in which the user provides a requested piece of personal information such as their email address. In other examples, the user can be requested to provide other personal identity information including their phone number. This information can also be called user datum. The email can be entered into a personal user device and transmitted to the administrator data processing system or some other system associated with the merchant. The user device may transmit the personal information by the processor, and the administrator data processing system my receive the personal information by its own processor. Alternatively, this step can be performed by some other server. The personal information may be sent over a network.

In action 510, the email or other personal information is fed into a hash function that has been shared with partner financial institutions. The hash function can be performed by the administrator processing system. A hash function can be any mathematical function that can be used to map a set of data into a different set of data. In some examples, a hash function can be a function that scrambles a piece of information so that the original information can be mathematically infeasible to figure out. The output of a hash function can be called a hash value, hash code, or simply a hash. Though there are many different kinds of hash functions, most hash functions convert variable-length keys into fixed-length values. For example SHA256, a very common hash function, will always produce an output of 256 bits no matter the length of the input. Other hash functions will produce outputs of other lengths, including 32 bits, 64 bits, or 128 bits.

Most hash functions will create a unique value for every input. For example, inputting the random data set of "8;nm, desfnyt55[9[[bdc,.aq123" through the SHA256 hash function will always produce the same output of:

01d81e1a585c9ac701e5e4cc24ddef098286ccef5516700-1f2ea5e41e06eaae1

If the input is changed even slightly, the output will appear completely different. For example, if the last character of the input is changed from a 3 to a 4, the resulting output becomes:

1a48beda31b3f56b92eaa30050c0bd16c061ca366be070-3d76dca46245a2dda9

Hash functions provide an added level of security to encryption and security access. Other hash functions that can be used include cyclic redundancy checks, checksums, universal hash function families, non-cryptographic hash functions, keyed cryptographic hash functions, and unkeyed cryptographic hash functions, or some other hash function. Once the email is fed through the hash function in action 510, a hashed email 515 results. It is understood that the hashed information in action 515 can include any user datum associated with a user, consumer, or account holder.

Having hashed the email, the administrator processing system in action 520 transmits the hashed email to one or more account processing systems potentially associated with the user. The account processing systems can be associated with banks, for example retail banks, commercial banks, community development banks, investment banks, online and neobanks, credit unions, or savings and loan banks. Action 520 acts under the implication that each account processing system has a hashed version of the same datum type (e.g., email address) for each of its account holders that has been hashed using the same hash function used by the administrator processing system in action 510. The account processing system may have an account associated with the user such as a spending account, growth account, or savings account. The hashed email may be associated with such an account.

Once the account processing system receives the hashed email from the administrator processing system, the account processing system determines whether any of its hashed emails on file matches the user's hashed email. This step can be performed by a processor associated with the account processing system or by some other processor. The account processing system may store the hashed email in its own data storage unit or in the database 150. It is understood that other embodiments can include other personal information besides email. As a nonlimiting example, the account processors can be provisioned with a hashed mobile phone number or address.

If the processor determines that there is not a match, then the account processing system may send an alert to the administrator processing system announcing that there is not a match in action 525. Alternatively, the account processing system may send no alert at all. In either circumstance, a finding of "no match" means that the processor will not send the merchant or user the virtual payment card. If the processor determines that there is a match, then the account processing systems may send an alert to the administrator processing system announcing that there is a match in action 530. In an example embodiment, finding a match will result in the administrator processing system presenting that particular account processing system as an option to the user. That is, the account processing system that found a matching email address will be an available option to the user for choosing a virtual payment card. In some cases, the administrator data processing system may receive positive responses from multiple account processing systems, each associated with a different bank. In some embodiments, the account processing system can match other types of information such as phone numbers, names, addresses, and other identifying information. Typically, the user datum to be hashed will be agreed upon by all partner institutions.

Figure 6:
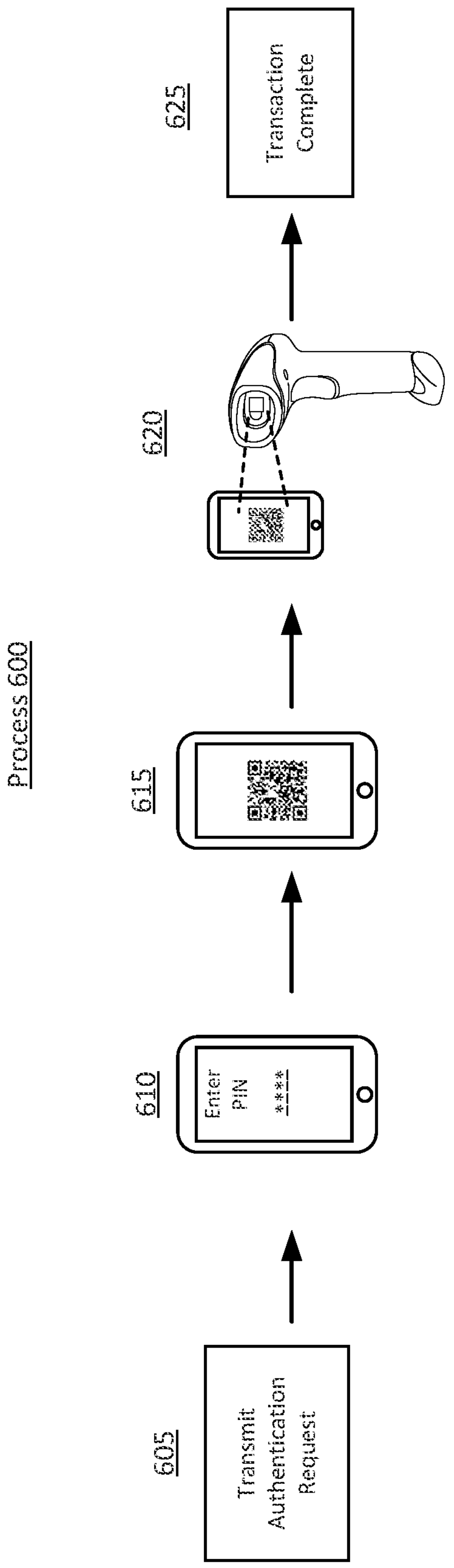
FIG. 6 is a diagram illustrating a QR code process according to an exemplary embodiment.

FIG. 6 illustrates a process 600 for verifying a user's identity then receiving a virtual payment card.

In action 605, the account processing system or administrator processing system transmits an authentication request to the user device. This action can be performed by a processor associated with the administrator processing system, the account processing system, or some other server. The authentication request may be sent over a network. Examples of an authentication request can include but are not limited to one time passwords (OTPs), PIN numbers associated with the user's one or more banking accounts, or a biometric. Biometric information can include without limitation facial scans, iris scans, fingerprint scans, a scalable ratio of facial features associated with the user, hand scans, voice recognitions, and handwriting recognitions. The authentication request may be transmitted in response to an earlier request from the user device for a virtual payment card.

In action 610, the user is prompted to transmit their authentication credential. Although FIG. 6 illustrates the authentication credential as a PIN number, it is understood that other authentication credentials may be entered such as a one-time password (OTP). The credential can be transmitted by the user device to the account processing system and the administrator processing system. The credential may be transmitted over a network.

In action 615, the user device receives the virtual payment card in the form of a code that incorporates payment provisioning information for a card account. The virtual payment card is discussed further with reference to FIGS. 2-4. The virtual payment card may be sent from the account processing system over a network. Although the virtual payment card in FIG. 6 is illustrated as a QR code, it is understood that other embodiments are contemplated such as raw card information NFC-enabled applications, or a virtual payment token.

In action 620, the merchant scans the QR code to receive the virtual payment card information, which the merchant can then use to complete the transaction at 625. In some embodiments, the virtual payment card information may include significant limitations to protect the user's financial information. For example, the QR code associated with the payment card may expire after a certain amount of time. As another example, the QR code may expire when the user device leaves a predetermined geographic location such as out of the store. As another example, the QR code may be limited by vendor. That is, the QR code may work only a specific vendor or seller. As another example, the virtual payment card may have limited funds. These limitations are discussed further with reference to FIG. 4. Although FIG. 4 illustrates a QR code scanner, it is understood that other embodiments can include NFC-enabled applications, raw-card information, or a virtual payment token.

Figure 7:
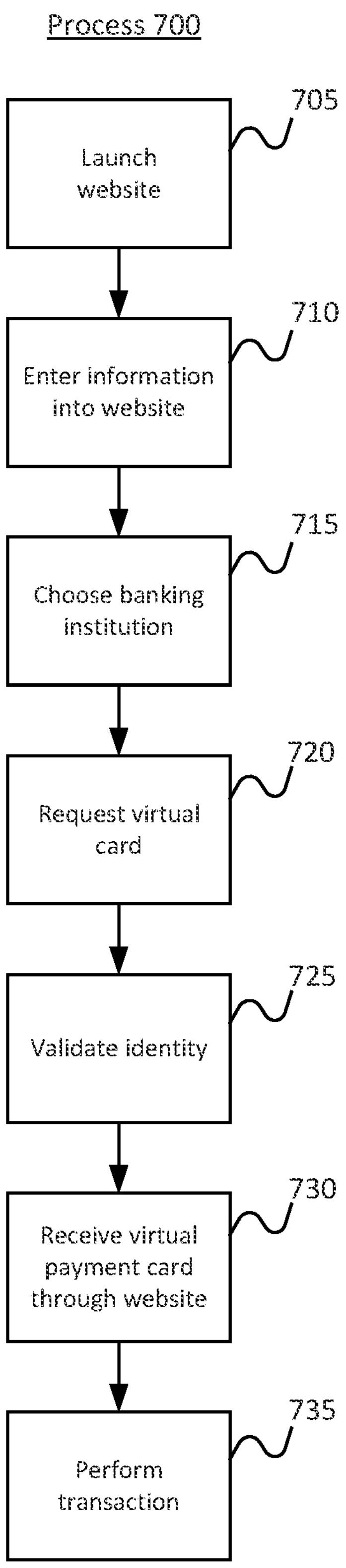
FIG. 7 is a method flowchart illustrating a website-based virtual card issuance according to an exemplary embodiment.

FIG. 7 is a method flowchart illustrating a website-based virtual card issuance.

The process 700 can begin with action 705 at which point the user can launch a website associated with the merchant or administrator data processor. The user can launch the website with a user device. In some embodiments, the website can be launched from a prompt such as a QR code or a URL link. The website may prompt the user to enter a personal information datum, which the user enters in action 710. The information can include any personal datum that may be associated with a payment card account including but not limited to an email address, phone number, or biometric.

Once the website has shared the user's personal information with one or more banking institutions by the merchant, the banking institutions can respond back to the merchant with a confirmation that they have an account associated with the user. In some embodiments, the banking institutions may, instead, transmit a message directly to the user device. At this point, the user may choose the banking institution from which they wish to obtain a virtual payment card in action 715. The action may be performed by a processor associated with the user device. The account associated with the user can be, without limitation, a spending account, savings account, growth account, or some other financial account.

After the user has selected a banking institution, they can request a virtual card in action 720. This request can be transmitted over a network from the user device to the account data processor either directly or through the administrator data processor. In response, the user can receive a request to verify their identity. Verification can happen in action 725 at which point the user can, through their user device, provide an authentication credential such as a password, PIN number, biometric, or some other authentication method. Once the authentication credential is received and verified, the user may receive a virtual payment card from the account data processor either directly via a network or through the merchant website in action 730. The virtual payment card, which includes payment card information associated with the user's card account, is discussed further with reference to FIGS. 2-4. In action 730, the virtual payment card can be available on the website in the form of an application, an applet, a URL, an NFC-enabled application, or some other website-compatible medium. Once the virtual payment card has been received, in action 735 the user can perform the transaction.

Figure 8:
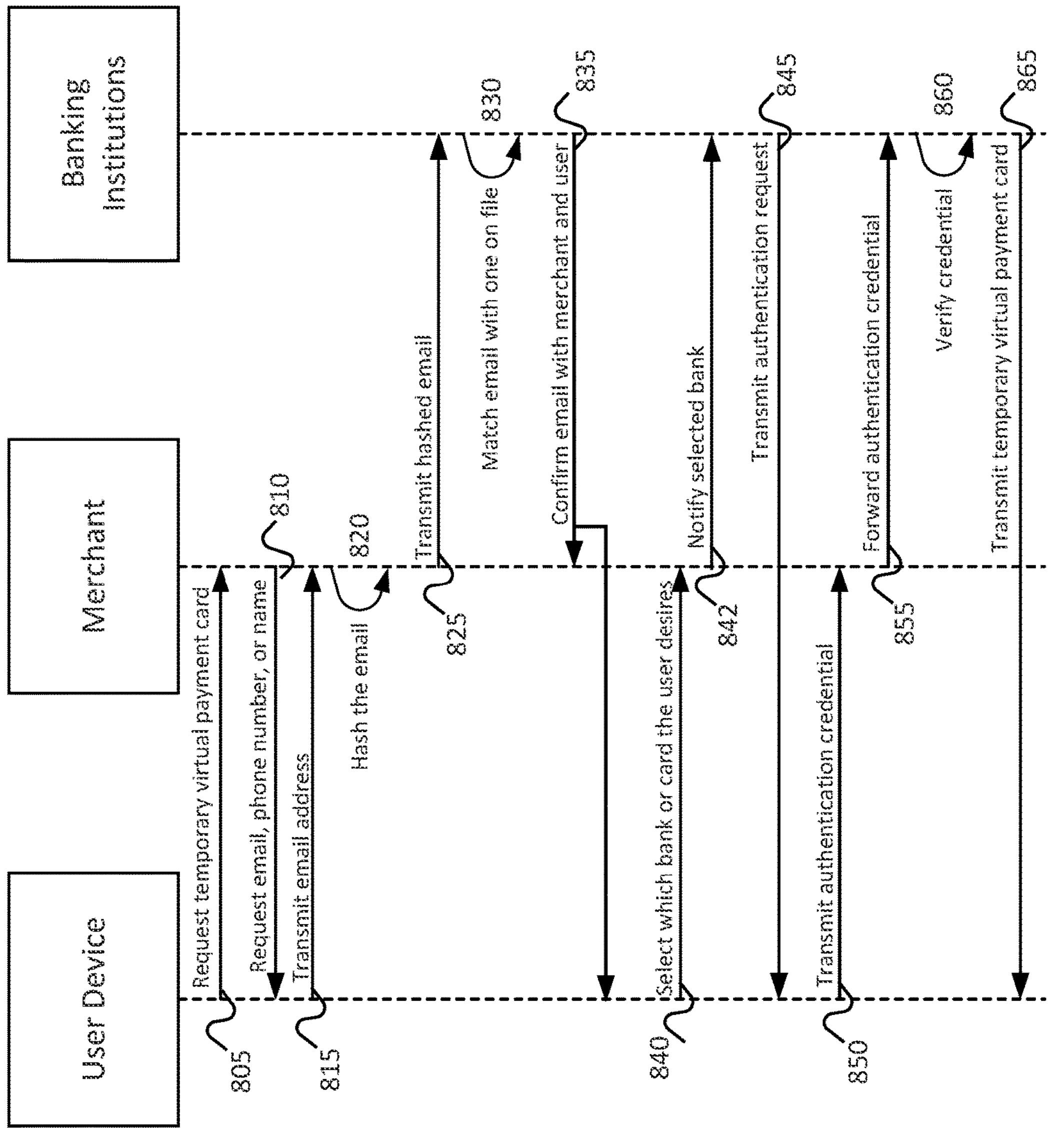
FIG. 8 is a sequence diagram illustrating a process according to an exemplary embodiment.

FIG. 8 illustrates a sequence diagram of an exemplary embodiment. The sequence 800 operates under the implication that the administrator data processing system is associated with a merchant, and the account processing system is associated with a banking institution holding a contactless card account for the user. The banking institution may be one of multiple banks partnering with the merchant to provide secure account holder identification through the use of shared datum encryption information/method and an agreed-upon user datum. It is understood that the banking institutions may use a web application or mobile application to verify the user authentication credential.

In action 805, the user device transmits a request for a temporary virtual payment card to the merchant. This action can be performed by a processor associated with the user device or some server, and it can be transmitted over a network.

In action 810, the merchant requests from the user personal identity information including, at least, the agreed-upon user datum. Examples of personal identity information can include without limitation email addresses, phone number, or names. In action 815, the user device responds to the request with the appropriate information including the user datum. Although FIG. 5 illustrates the user datum as an email address, it is understood that other personal information may be used.

In action 820, the merchant hashes the user datum provided by the user. This step may be performed by a processor associated with the merchant. This protects the identity information associated with the user. Hash functions and hashes are described further with reference to FIG. 3. In action 825, the merchant transmits the hashed user datum to one or more banking institutions. It is understood that the merchant may have a pre-existing relationship with one more banking institutions so that transmission occurs more quickly. The merchant can prompt the user to select particular banking institutions he wishes to send the hashed email. Action 825 can be performed by a processor associated with the merchant.

In action 830, one or more banking institutions can compare the hashed datum from the merchant with hashed datum values previously established using the shared encryption information/method and user data for account holders. This step can be performed by a processor. If the banking institution matches the hashed datum with a hashed datum on file, this means that the user has an existing account associated with the banking institution. The existing account can be a spending account, growth account, or savings account.

After matching the user's datum with one on file, one or more banking institutions transmits a confirmation message or confirmation response to the merchant and user device in action 835. This action can be performed by a processor associated with the banking institution. In some embodiments, the confirmation message may be sent to the user device via the merchant. In other embodiments, the confirmation message may be sent directly to the user device and not to the merchant. If multiple banks have confirmed the datum, then the user can select which account the user desires to use and transmit the selection to the merchant in action 840. This allows for greater spending freedom for the user. This action may be performed by a processor associated with the user device or some server.

Upon receiving a selection from the user, the merchant may send a notification to the selected bank in action 842. In action 845, the bank transmits an authentication request or confirmation authentication request to the user. The authentication request is meant to verify the user's identity, his or her information, and generally to protect against fraud. This action may be performed by a processor associated with the bank or some other server.

In response to the authentication request, the user can send one or more authentication credentials or confirmation responses to the merchant in action 850. The credentials can include without limitation a one-time-password (OTP), a PIN number, or a biometric. It is understood that one or more credential can be used and that multi-factor information may be used as well. This action can be performed by a processor associated with the user device. The authentication credential can be transmitted over a network to the banking institution in action 855. In action 860, the bank verifies the authentication credential. This step can be performed by a processor associated with the banking institution or some server. In alternative embodiments, the user may transmit the authentication credential directly to the banking institution.

After verifying the authentication credential, the bank transmits virtual payment card information to the user device in action 865. As previously described, this may be in the form of a code that is not decipherable by the user, but that includes the payment information required by the merchant to complete a payment transaction on the user's card account with the bank. The virtual payment card information can be transmitted by a processor over a network.

Figure 9:
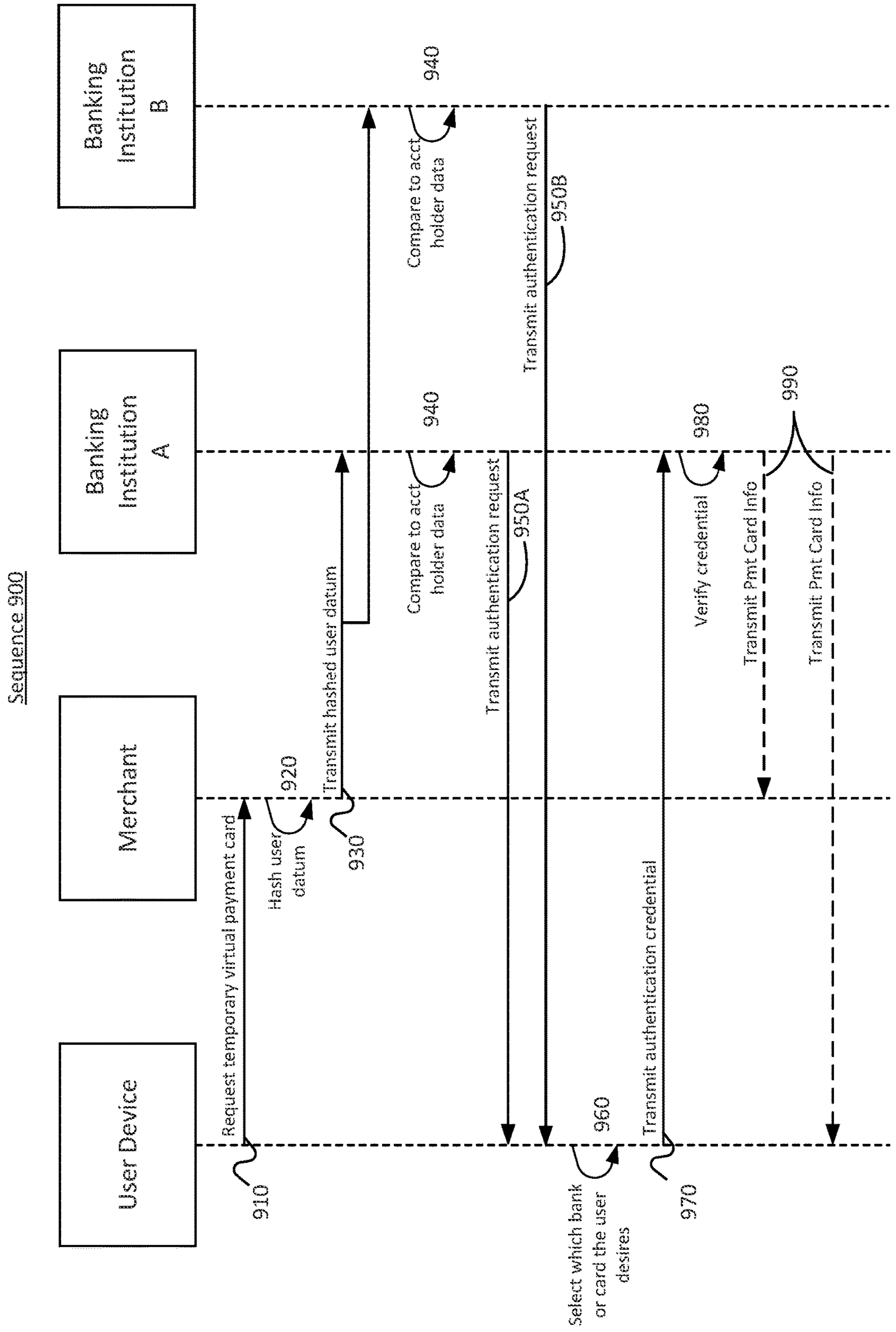
FIG. 9 is a sequence diagram illustrating a process according to an exemplary embodiment.

FIG. 9 illustrates a sequence diagram of an exemplary embodiment. All actions in the sequence may be carried out by automated data processing systems except for actions taken by a user. The sequence 900 operates under the implication that the administrator data processing system is associated with a merchant, and that there is a plurality of account processing systems, each associated with a banking institution, one or more of which have a contactless card account for the user. The banking institutions may be partnering with the merchant to provide secure account holder identification through the use of shared datum encryption information/method and an agreed-upon user datum type. As previously discussed, this may be an email address, phone number or other common user-associated datum typically included a user's account information.

In action 910, the merchant receives a request for a temporary virtual payment card from the user device to the merchant. This may be received as part of an interactive communication session over the web (e.g., through a merchant website) or through a one-time request received via email or direct transmission communication. The request may include a user-supplied user datum of the type agreed upon by the partner institutions. In some embodiments, the user datum may be provided by the user upon request by the merchant.

In action 920, the merchant hashes the user datum provided by the user. This step may be performed by a processor associated with the merchant. This protects the identity information associated with the user. Hash functions and hashes are described further with reference to FIG. 3. In action 930, the merchant transmits the hashed user datum to the partner banking institutions, which include Banking Institution A and Banking Institution B. It is understood that the merchant may have a pre-existing relationship with the banking institutions so that transmission occurs more quickly. At 940, each of the banking institutions compares the hashed datum from the merchant with hashed datum values previously established using the shared encryption information/method and known user data for existing account holders. If the banking institution matches the hashed datum with a hashed datum on file, this means that the user has an existing account associated with the banking institution. The existing account can be a spending account, growth account, or savings account. The bank may then retrieve user account information for the account associated with the matching hashed datum.

In the exemplary sequence 900, Banking Institutions A and B both determine that they have a matching hashed datum, indicating they both have card accounts for the user. In action 950A, Banking Institutions A retrieves user device information for a user device associated with the user/account holder and transmits an authentication request to the user device over a network. In typical embodiments, this may be in the form of a text message. In action 950B, Banking Institution B similarly transmits an authentication request to the user device. Each authentication request may identify the banking institution, make note of the user's desire for a virtual payment card, and request that the user respond with user authentication information as a confirmation that the user wishes to obtain the temporary card from that bank. The requested authentication information may be or include, for example, a password, an OTP, a PIN, or a biometric characteristic. It is understood that one or more credential may be requested and that multi-factor information may be used as well.

Having received authentication requests from multiple banks, the user, at 960, makes a determination as to which bank and card account he wishes to use. In the exemplary scenario, the user selects Banking Institution A, and, at 970, the user device transmits the requested authentication information to Banking Institution A, which verifies the authentication information at 980.

At 990, Banking Institution A retrieves the account payment information required by the merchant to process a transaction on the user's card account. It may also determine limitations on the use of the payment information as a temporary virtual payment card. At 990, Banking Institution A transmits the virtual payment card information to either or both of the merchant and the user device. In embodiments where the virtual payment card information is transmitted to the user device, it may be presented in the form of a code that is not decipherable by the user or user device, but that can be presented to the merchant. As previously discussed, the virtual payment card information may be in the form of a QR code that contains required payment information and any limitations on the use of the payment information (e.g., time or location).

Once the virtual payment card information has been transmitted, the user may use the virtual payment card for carrying out transaction with the merchant within the limitations specified for the card. In embodiments where the user has received the payment information as a QR code, for example, the user need only present the code at the time a purchase is made. After scanning the code, the merchant may, itself, decipher the code to obtain the payment information or, alternatively, transmit the code to the bank, which then sends the payment information to the merchant for processing the transaction.

As used herein, virtual payment cards can refer to unique payment cards that allow users to complete transactions on their main payment card account associated with one or more of their financial accounts. It is understood that the functions of virtual cards are not limited thereto, and in addition to financial transactions, can be used for identity verification transactions, area access transactions, user authentication transactions, membership verification transactions, eligibility verification transactions, and any other operation involving a card.

As used herein, user information, personal information, and sensitive information can include any information relating to the user, such as a private information and non-private information. Private information can include any sensitive data, including financial data (e.g., account information, account balances, account activity), personal information/personally-identifiable information (e.g., social security number, home or work address, birth date, telephone number, email address, passport number, driver's license number), access information (e.g., passwords, security codes, authorization codes, biometric data), and any other information that user may desire to avoid revealing to unauthorized persons. Non-private information can include any data that is publicly known or otherwise not intended to be kept private.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Further, it is to be understood that the terminology used herein is for the purpose of describing particular embodiments only and is not intended to be limiting. The terms "a" or "an" as used herein, are defined as one or more than one. The term "plurality" as used herein, is defined as two or more than two. The term "another" as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

The invention is not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The invention is to be limited only by the terms of the appended claims, along with the full scope of equivalents to which such representative claims are entitled.

What is claimed is:

1. A system for generating an account provisioning network, the system comprising:

memory comprising executable instructions; and a banking processor to execute the executable instructions, which when executed causes the banking processor to:

store one or more payment information datum in a data storage unit;

receive, from a merchant processor, an encrypted user datum;

determine whether the encrypted user datum matches with one or more user profiles on file;

establish and retain a web session, over a first communication network, with a user device of a user on file;

transmit, upon determining that the encrypted user datum matches at least one user on file, an authentication request to the user device;

receive, from the user device, an authentication credential;

verify the authentication credential;

retrieve the payment information datum from the data storage unit;

generate a website compatible datafile that includes the payment information datum and or a digital link that links to the payment information datum;

transmit the website compatible datafile or digital link to a merchant website that is accessible by the user device to download the website compatible datafile or digital link to retrieve the payment information datum; and in response to determining that the user device has left a predetermined geographical area or a predetermined period of time has occurred, send a message to the merchant website indicating that the payment information datum has expired;

wherein:

the website compatible datafile is selected from one of an application file, an application executable file, an applet file, or a near field communication (NFC)-enabled application file; or the digital link is a uniform resource locator (URL) that, when interacted with by the user device, causes the user device to obtain or receive the payment information datum.

2. The system of claim 1, wherein the authentication credential includes encrypted information received by the user device from a contactless card associated with a transaction account associated with the user profile.

3. The system of claim 1, wherein the authentication credential includes multi-factor information associated with the user profile.

4. The system of claim 1, wherein the encrypted user datum is at least one selected from the group of a phone number, a name, and an email address.

5. The system of claim 1, wherein the user profile is a contactless card account.

6. The system of claim 1, wherein the payment information datum includes temporary virtual payment card information sufficient to complete one or more transactions.

7. The system of claim 6, wherein temporary virtual payment card information comprises at least one from the group of: a quick response (QR) code, an NFC-enabled application, or a predetermined set of card information.

8. The system of claim 7, wherein:

the temporary virtual payment card information is or includes a quick response (QR) code, and the banking processor is further caused to receive a copy of the QR code from the user device as part of a payment transaction.

9. The system of claim 1, wherein the banking processor is further caused to display a list of one or more account providers associated with the encrypted user datum.

10. A method for generating an account provisioning network, the method comprising:

storing, by a banking processor, one or more payment information datum in a data storage unit;

receiving, by the banking processor from a merchant processor, an encrypted user datum;

determining, by the banking processor whether the encrypted user datum matches with one or more user profiles on file;

establishing and retaining, over a first communication network, a web session with a user device of a user on file;

transmitting, by the banking processor upon determining that the encrypted user datum matches at least one user on file, an authentication request to a user on file via a user device;

receiving, by the banking processor from the user device, an authentication credential;

verifying, by the banking processor, the authentication credential;

retrieving, by the banking processor, the payment information datum from the data storage unit;

generating a website compatible datafile that includes the payment information datum and or a digital link that links to the payment information datum;

transmitting, by the banking processor to a merchant website, the website compatible datafile or digital link to a merchant website that is accessible by the user device to download the website compatible datafile or digital link to retrieve the payment information datum; and in response to determining that the user device has left a predetermined geographical area or a predetermined period of time has occurred, sending a message to the merchant website indicating that the payment information datum has expired;

wherein:

the website compatible datafile is selected from one of an application file, an application executable file, an applet file, or a near field communication (NFC)-enabled application file; or the digital link is a uniform resource locator (URL) that, when interacted with by the user device, causes the user device to obtain or receive the payment information datum.

11. The method of claim 10, wherein the authentication credential includes a biometric comprising at least one selected from the group of fingerprints, facial recognition, and voice recognition.

12. The method of claim 10, wherein the authentication credential includes a one-time password (OTP).

13. The method of claim 10, wherein the authentication credential includes a personal identification number (PIN) number belonging to the user profile.

14. The method of claim 10, wherein the user profile is a contactless card account.

15. The method of claim 10, wherein the payment information datum includes temporary virtual payment card information sufficient to complete one or more transactions.

16. The method of claim 15, wherein the temporary virtual payment card information comprises a predetermined spending limit.

17. The method of claim 15, wherein the user datum is at least one selected from the group of a phone number, a name, and an email address.

18. The method of claim 17, wherein the temporary virtual payment card information comprises at least one from the group consisting of a quick response (QR) code, an RFD-enabled applet, or a predetermined set of card information.

19. The method of claim 10, wherein the authentication credential is received, by the banking processor, over a near field communication (NFC).

20. A non-transitory, computer readable medium comprising instructions that, when executed by a banking processor, cause the banking processor to perform actions comprising:

storing one or more payment information datum in a data storage unit;

receiving, from a merchant processor, encrypted user datum;

determining whether the encrypted user datum matches with one or more user profiles on file;

establishing and retaining, over a first communication network, a web session with a user device of a user on file;

transmitting, upon determining that the encrypted user datum matches at least one user on file, an authentication request to a user on file via a user device;

receiving, from the user device, an authentication credential;

verifying the authentication credential;

retrieving the payment information datum from the data storage unit;

generating a website compatible datafile that includes the payment information datum and or a digital link that links to the payment information datum;

transmitting, to a merchant website, the website compatible datafile or digital link to a merchant website that is accessible by the user device to download the website compatible datafile or digital link to retrieve the payment information datum; and in response to determining that the user device has left a predetermined geographical area or a predetermined period of time has occurred, sending a message to the merchant website indicating that the payment information datum has expired;

wherein:

the website compatible datafile is selected from one of an application file, an application executable file, an applet file, or a near field communication (NFC)-enabled application file; or the digital link is a uniform resource locator (URL) that, when interacted with by the user device, causes the user device to obtain or receive the payment information datum.

* * * * *